United States Patent [19]

De Leeuw et al.

[11] 3,888,112
[45] June 10, 1975

[54] APPARATUS FOR QUANTITATIVE ANALYSIS

[75] Inventors: Paul De Leeuw; Johan Christiaan Willem Kruishoop, both of Eindhoven, Netherlands

[73] Assignee: U.S. Philips Corporation, New York, N.Y.

[22] Filed: Sept. 28, 1973

[21] Appl. No.: 401,850

[30] Foreign Application Priority Data
Oct. 11, 1972 Netherlands.................... 7213711

[52] U.S. Cl..................... 73/61.1 R; 73/1 R; 73/28
[51] Int. Cl. ............................................. G01n 27/50
[58] Field of Search......... 73/61.1 R, 61 R, 1 R, 23, 73/28

[56] References Cited
UNITED STATES PATENTS

| 3,206,449 | 9/1965 | Van Luik, Jr............... | 73/28 X |
| 3,242,715 | 3/1966 | Hubner...................... | 73/1 R |
| 3,300,282 | 1/1967 | Risk et al................... | 73/23 X |
| 3,611,790 | 10/1971 | Brouwer et al............. | 73/61.1 R |
| 3,674,435 | 7/1972 | Van Luik, Jr. et al...... | 73/1 R UX |
| 3,776,023 | 12/1973 | Budd et al.................. | 73/1 R |

Primary Examiner—Richard C. Queisser
Assistant Examiner—Joseph W. Roskos
Attorney, Agent, or Firm—Frank R. Trifari; David R. Treacy

[57] ABSTRACT

An apparatus for the quantitative analysis of a fluid, which employs the same fluid to generate a null signal, a calibration signal and a measuring signal. A calibration source adds a known amount of constituents to a carrier fluid, derived from the original fluid calibration purposes. A cleaning filter extracts unwanted components from the carrier fluid so as to prevent contamination or chemical attack of the injection zone.

5 Claims, 4 Drawing Figures

APPARATUS FOR QUANTITATIVE ANALYSIS

The invention relates to an apparatus for the continuous and quantitative analysis of one or more constituents of a fluid, including a measuring cell, an absorption filter which absorbs the constituents to be measured from the fluid, a calibration source which supplies a known amount of constituents of the type to be measured to the fluid, and interconnection means. The interconnection means has at least two outlets, a first outlet being connected to the measuring cell. The calibration source is included in a connection pipe between the first and second outlets.

Such an apparatus is known from U.S. Pat. No. 3,611,790.

For calibrating the measurement cell the known apparatus employs a calibration source, which supplies a known amount of constituents of the type to be measured to the fluid flowing through it. For such a calibration source injection methods may be used, which operate either discontinuously or continuously, for example a known amount of constituents per unit of time being injected into the fluid stream via a very small aperture under increased pressure. In practice, injection syringes with injection needles, driven by a motor, or gas cylinders with injection needles may be used. Diffusion methods are also applied. As an example, the known apparatus uses an $SO_2$ source comprising a storage chamber which contains $SO_2$, having a small opening which terminates in a flow space. The opening is closed by a semi-permeable membrane, so that small amounts of $SO_2$ are supplied to the gas flowing through the flow space by diffusion.

When a calibration source of such construction is employed for a different gas or a different liquid, this sometimes appears to give rise to a practical problem, i.e. to attack, contamination or chemical reaction on the surface of the semi-permeable membrane. A solution to this problem is to have the diffusion take place to a carrier fluid which causes no reactions on the surface of the semi-permeable diaphragm, so that the supply of the known amount of constituents by the calibration source is not disturbed. For this, a storage cylinder with an inert fluid may be employed, which continuously flows along the semi-permeable diaphragm. Said flow with the extracted constituents is mixed with the fluid to be measured.

It is an object of the invention to provide a different solution to the said problem, which is characterized by its simplicity.

The apparatus according to the invention has the advantage that a carrier fluid to be stored separately is not required, but that this is prepared from the fluid stream to be measured by removal of all fluid constituents which might give rise to attack or reaction on the surface of the semipermeable membrane. The apparatus according to the invention is not limited to the use of a diffusion process, but may equally be employed with any type of source having a storage space, whenever the fluid stream to be measured is known to contain constituents which are not removed by the absorption filter, and which constituents are known to attack or contaminated the injection spot of the storage space, thus affecting the calibration.

Accordingly, an apparatus according to the invention comprises a calibration source having a calibration source pipe with flow resistance, which includes a cleaning filter and a storage vessel for constituents of the type to be measured for supplying a known amount of constituents by means of a carrier fluid which is derived from the fluid stream to be measured after removal of, inter alia, the constituents to be measured. To accomplish this, a branch is inserted between the inlet of the supply pipe and the inlets of the interconnection means, to which branch the calibration source pipe is connected at the inlet side of the cleaning filter. Main flow resistances are interposed between the branch and the connections of the calibration source, across which the fluid stream flow causes a drop in pressure and whose resistance value is several times smaller than the value of the calibration flow resistance. A calibration source outlet is connected from an outlet side of the storage vessel to an interconnection means by a T-member, whose sides are connected to two outlets of the interconnection means, the first outlet being connected also to the measuring cell.

In one embodiment the branch and one main flow resistance are included in the supply pipe. Here, the cleaning filter should absorb all the constituents leading to the absorption filter of type to be measured, and it should also remove aggressive components which may disturb the calibration.

In a different embodiment the branch is interposed between the outlet of the asbsorption filter and a first inlet of the interconnection means and a first main flow resistance is provided between the T-member at the calibration source outlet and the branch. A second main flow resistance of substantially the same value as the first main flow resistance is provided in a separate flow path between the inlet of the supply pipe, through the interconnection means, to the T-member.

An advantage of this embodiment is that the absorption filter is also used for the flow of carrier fluid to be bled off, so that the cleaning filter need only be equipped for the residual components which, because they attack the injection zone, are to be removed.

The invention will be described by way of example with reference to the drawing, in which.

Figure 1:
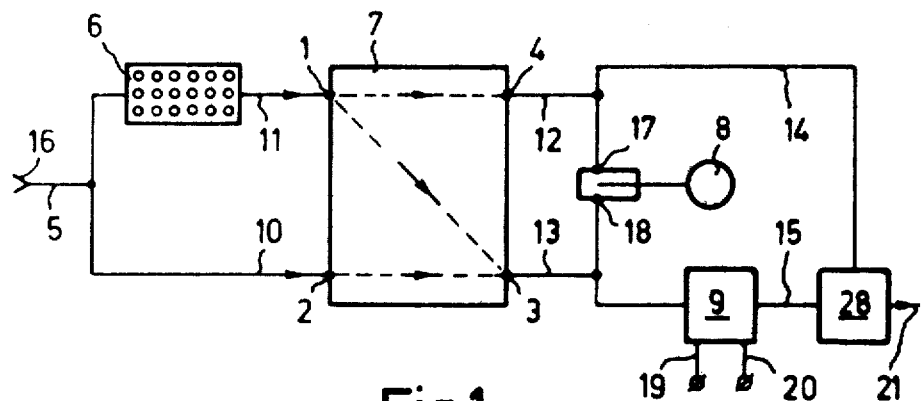
FIG. 1 is a schematic diagram of a known apparatus.

As shown in FIG. 1; the fluid which is to be examined for the presence of certain substances is supplied to an inlet 16 of a supply pipe 5. Through a T-member the fluid can be transferred through a pipe 10 to an inlet 2 of an interconnection means 7, when this is set to the measuring position, inlet 2 then being interconnected with outlet 3. When the interconnection means 7 is set to the zero or calibration position, in which the inlet 1 is interconnected with the outlet 3 or the outlet 4, the fluid stream is fed through the absorption filter 6 via a pipe 11 to inlet 1. The constituents of the fluid stream to be measured are removed by the filter 6.

The interconnection means 7 may comprise a four-way cock or controllable valves, the appropriate inlets always being connected to the desired outlets. The calibration source 8 is included with the connections 17 and 18 in a pipe interconnecting the pipe 12 connected to the outlet 4 and the pipe 13 connected to the outlet 3. A flow means 28, to which the pipes 14 and 15 are connected, causes the fluid to flow through the apparatus, said fluid being discharged via the discharge pipe 21. The pipe 14 is conected to pipe 12 and the pipe 15 is connected to the measuring cell 9, which is provided with measuring terminals 19 and 20.

The other connection of measuring cell 9 is connected to pipe 13 by a pipe. When the pipe 12 carries a fluid stream this stream divides into a part which is drained by pipe 14 and into a part which passes the calibration source 8 and the measuring cell 9, the calibration source 8 adds a known amount of constituents to the purified stream which is measured in the measuring cell 9 and which results in a calibration signal at the terminals 19 and 20. When the pipe 13 carries a fluid stream, said stream divides into a part which vents the calibration source 8 and which is drained by the pipe 14. The other part of the stream passes the measuring cell 9 and produces a null signal at the measuring terminals 19 and 20 when the means 7 is set to the interconnection position 1–3, and a measuring signal when it is set to the interconnection position 2–3. The measuring cell 9 is adapted to convert the constituents of the fluid stream to be measured into a proportional electrical signal from which, for example, a concentration can be derived to be expressed in micrograms per liter or p.p.m. (parts per million).

Figure 2:
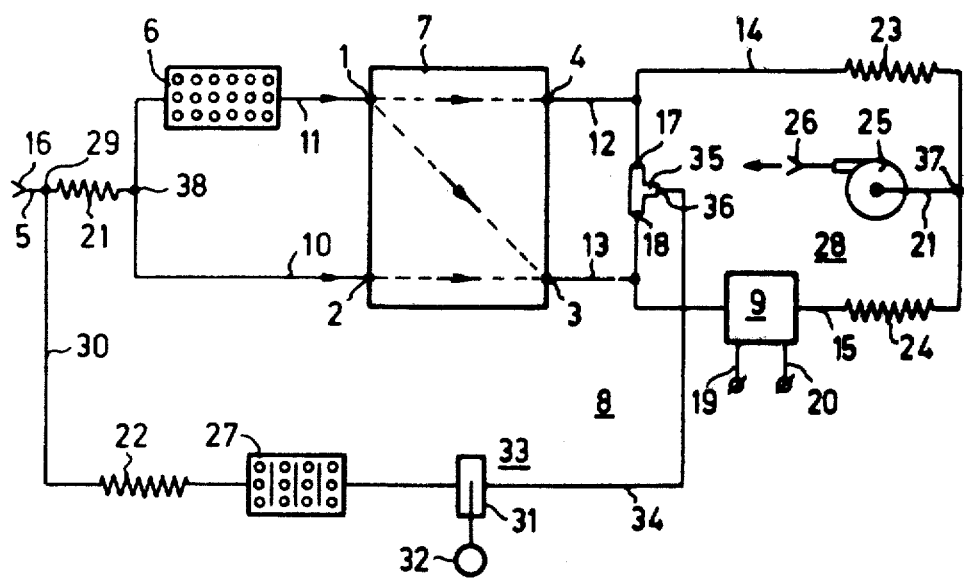
FIG. 2 shows an apparatus according to the invention.

FIG. 2 shows an apparatus according to the invention using the block diagram of FIG. 1 and the reference numbers already used in that Figure. The flow means 28 comprises substantially equal flow resistance, 23 in pipe 14 and 24 in pipe 15, which via a T-member 37 terminate in pipe 21, which includes a pump 25 with a discharge opening 26.

The resistance 23 and 24, for example in the form of capillary restrictions, determine the flow rate of the fluid stream in the entire apparatus. They may be considered as sources which maintain a constant flow rate. In FIG. 2 the apparatus of FIG. 1 includes a branch 29 and a small flow resistance 21 in the supply pipe 5 between the branch 29 and the T- member 38. the calibration source 8 has the connections 17 and 18 constituted by a T-member 35 with supply connection 36. Connected to this is a pipe 34, whose other end is connected to a storage vessel 33, consisting of a flow space 31 and a storage space 32. The other connection of the flow space 31 is connected to a cleaning filter 27, which via a flow resistance 22 and a pipe 30 is connected to the branch 29. The fluid stream in the pipe 5 causes a drop in pressure across the main flow resistance 21, which is measurable between the branch 29 and the connection 36 of the T-member 35. The value of said resistance is such that said pressure drop measured across the calibration source pipe 30 and 34 is substantially constant, independent of the setting of the means 7. As the said calibration source pipe includes a flow resistance whose value is many times greater than the value of the resistance 21, a small portion of the fluid stream in pipe 5 will bleed off through the calibration source pipe.

It is obvious that in this embodiment the flow rate of said small portion is substantially constant. In FIG. 2 the flow resistance of the calibration source pipe is represented by the resistance 22. The cleaning filter 27 extracts undesired constituents, including the constituents to be analyzed, from the small flow of carrier fluid, so that the flow space 31 receives such a pure stream of fluid that a known amount of constituents to be measured from the storage space 32 can be added to said stream. Independent of the type of injection, for example injection syringe or semi-permeable membrane, the injection zone is not contaminated or chemically attached. An example of this is the measurement of $NO_2$ in a gas stream, such as air, the storage space 32 containing a concentrated amount of $NO_2$ and the known amount being supplied through a semi-permeable diaphragm. The filter 27 ensures that $NO_2$ is removed and that the water vapor is absorbed, because it has been found that water vapour at the surface of the semi-permeable diaphragm substantially reduces the supply of $NO_2$.

Figure 3:
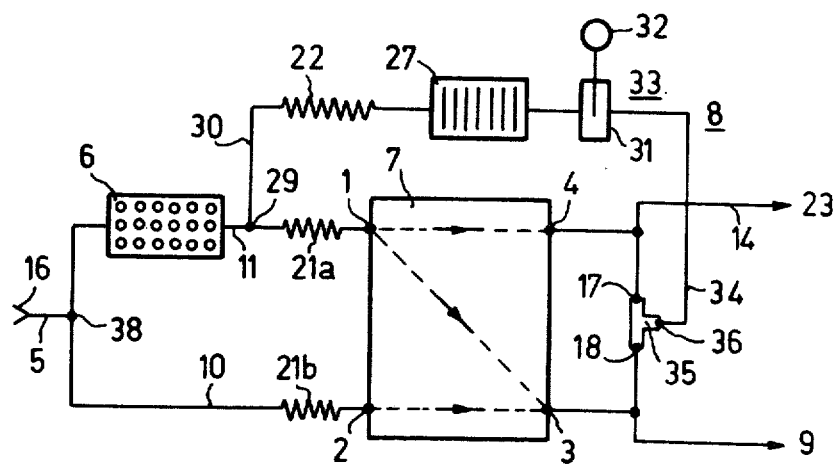
FIG. 3 shows a different apparatus according to the invention.

FIG. 3 shows an embodiment of FIG. 2 with the same reference numerals. The calibration source pipe with its branch 29 is disposed behind the absorption filter 6, thus permitting the cleaning filter 27 to be simplified. Since it only need 2 to extract further aggressive components from the carrier stream. In this apparatus two main flow resistances are required, to be included between the branch 29 and the connection 17, for example as denoted by 21a in FIG. 3, and between the T-member 38, via pipe 10, the connection 18, for example as shown and denoted by 21b. The interconnection means 7 may also include said main flow resistances in the form of constrictions already present.

Figure 4:
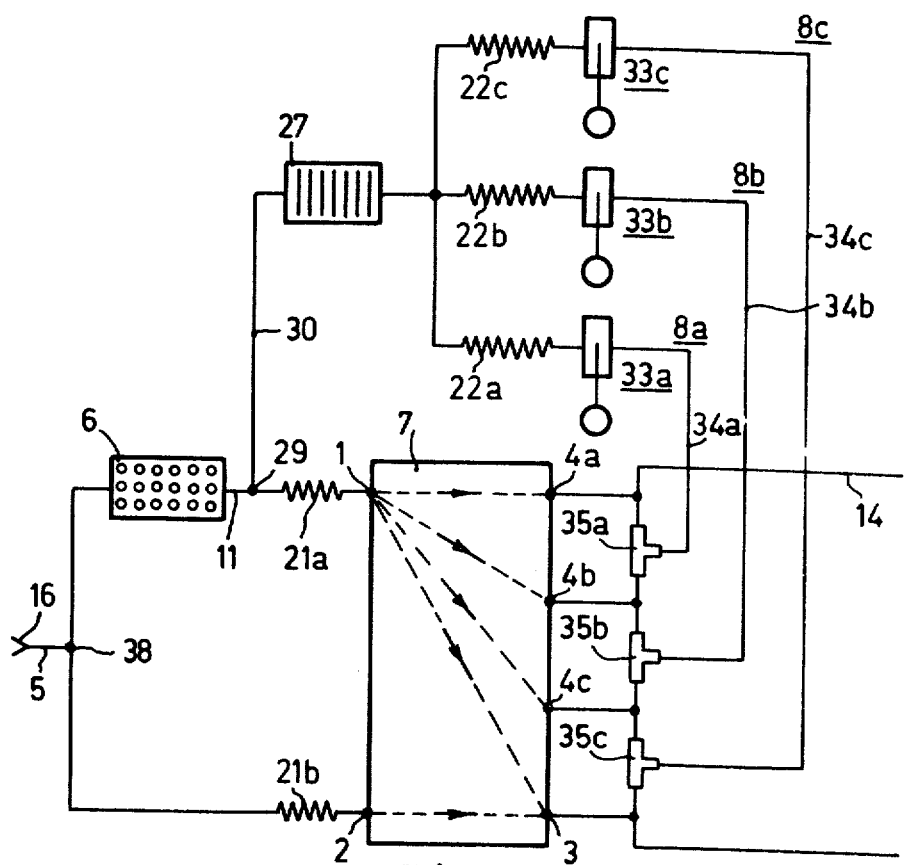
FIG. 4 shows an embodiment of the apparatus of FIG. 3.

FIG. 4 shows an extension of the apparatus of FIG. 3, which in principle is also applicable to the apparatus of FIG. 2.

The interconnection means 7 is provided with several outlets 4; i.e., the outlets 4a, 4b and 4c. Three calibration pipes are provided, all equipped as is described with reference to FIG. 2. The cleaning filter 27 is shown combined for all calibration pipes in FIG. 4, which is economical. Each calibration source has a separate flow resistance 22a, 22b and 22c respectively, a storage vessel 33a, 33b and 33c and a connection T-member 35a, 35b and 35c included in the connection pipes between the outputs 3–4c, 4c–4b and 4b–4a. By means of this apparatus three calibration points can be obtained, enabling a correct calibration of a non-linear measuring curve of the measuring cell 9.

What is claimed is:

1. An apparatus for the analysis of constituents of a fluid of the type comprising a measuring cell having an inlet and a discharge outlet connected to a discharge flow means; inlet means for supplying a fluid stream to be tested; means connected to said inlet means for filtering at least a portion of said fluid stream; calibration means for adding a known concentration of source fluid to a carrier fluid, said carrier fluid being at least a portion of said fluid stream; and interconnection means for supplying the inlet of said measuring cell alternatively with fluid filtered by said filtering means, unfiltered fluid, or calibrating fluid, said calibrating fluid comprising at least carrier fluid and source fluid from said calibration means; wherein said apparatus comprises a main flow resistance so connected that flow of the fluid stream causes a pressure drop between said inlet means and the inlet of said measuring cell; said calibration means comprises branch means connected between said inlet means and said main flow resistance for supplying a portion of the fluid stream to the calibration means to serve as carrier fluid; and a calibration flow resistance through which said carrier fluid flows for controlling the amount of carrier fluid flow; and said interconnection means comprises an interconnection valve having at least first and second outlets, a T-member having a leg and two sides, the sides being connected respectively to said first and second outlets, the second outlet being connected to said calibration means for receiving carrier and source fluid, and means connecting said first outlet to the inlet of the measuring cell.

2. An apparatus as claimed in claim 1, wherein said branch means and said main flow resistance are located in a supply pipe upstream of said filtering means.

3. An apparatus as claimed in claim 1, wherein said branch means is connected between an outlet of said filtering means and a first inlet of said interconnection means, a first main flow resistance is connected in a flow path between the branch means and said T-member, and a second main flow resistance is connected in another flow path connected between a supply pipe upstream of said branch means and said T-member.

4. An apparatus as claimed in claim 3, wherein said first and second main flow resistance have approximately the same value.

5. An apparatus as claimed in claim 1, wherein said calibration means also comprises a cleaning filter for removing from said carrier fluid constituents which will react in or contaminate an injection zone where source fluid is added.

* * * * *